United States Patent [19]

Arkus-Duntov

[11] Patent Number: 4,466,389
[45] Date of Patent: Aug. 21, 1984

[54] INTAKE-MANIFOLD
[75] Inventor: Zora Arkus-Duntov, Grosse Pointe, Mich.
[73] Assignee: Colt Industries Operating Corp, New York, N.Y.
[21] Appl. No.: 418,042
[22] Filed: Sep. 14, 1982

Related U.S. Application Data

[63] Continuation of Ser. No. 93,112, Nov. 13, 1979, abandoned.

[51] Int. Cl.³ ............................................... F02B 27/00
[52] U.S. Cl. ........................... 123/52 MB; 123/52 MV
[58] Field of Search ......... 123/52 M, 52 MB, 52 MV, 123/52 MC, 55 VE

[56] References Cited

U.S. PATENT DOCUMENTS

| | | | |
|---|---|---|---|
| 2,337,050 | 12/1943 | Jackson | 123/52 MB |
| 2,766,743 | 10/1956 | Platner et al. | 123/52 MV |
| 3,505,983 | 4/1970 | Hartel | 123/52 M |
| 3,930,473 | 1/1976 | McFarland | 123/52 MV |
| 4,072,133 | 2/1978 | McWhirter | 123/52 MV |
| 4,240,387 | 12/1980 | Motosugi et al. | 123/52 MB |
| 4,262,639 | 4/1981 | Motosugi et al. | 123/52 MB |

FOREIGN PATENT DOCUMENTS 1380600  1/1975  United Kingdom ................ 123/568

*Primary Examiner*—Craig R. Feinberg
*Attorney, Agent, or Firm*—Walter Potoroka, Sr.

[57] ABSTRACT

An intake manifold for an internal combustion engine, is shown as having a body, a riser carried by the body, a medially disposed wall in the riser, first and second plenum chambers formed in the riser at opposite sides of the medially disposed wall, a plurality of induction passages leading to respective outlets communicate with the plenum chambers in a manner whereby some communicate with only the first plenum chamber while the remainder communicate with only the second plenum chamber, and a resonating passage is placed in operative communication with both the first and second plenum chambers.

7 Claims, 8 Drawing Figures

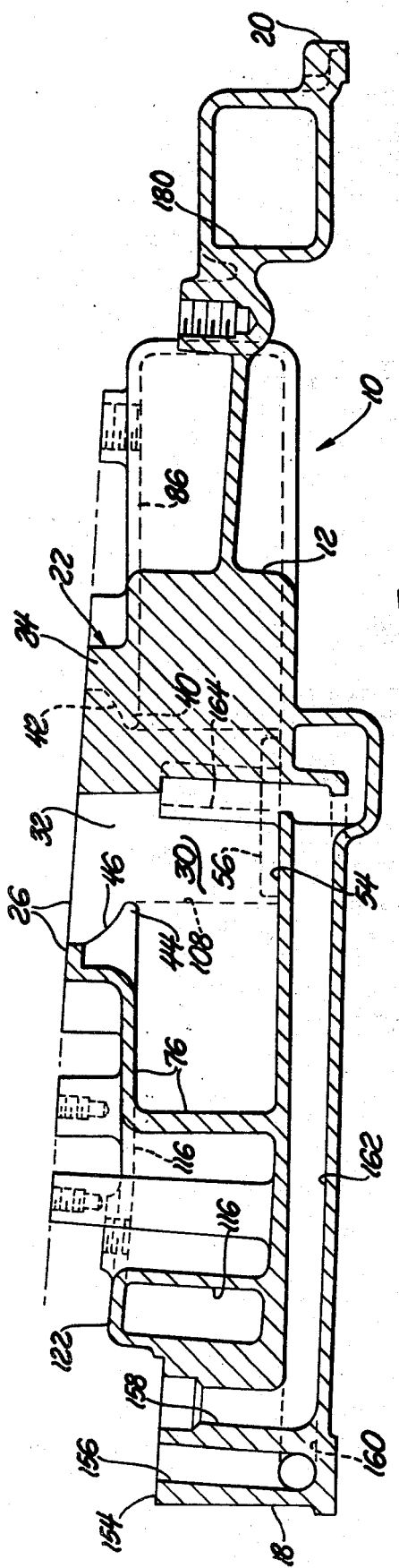
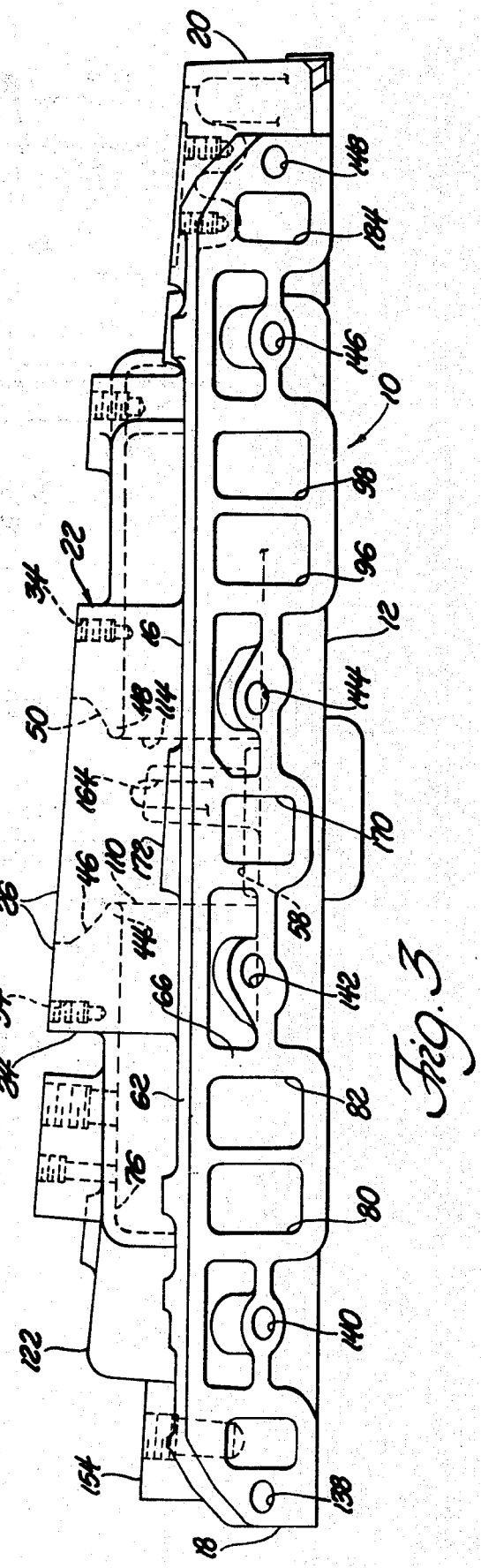
Fig. 2
Fig. 3

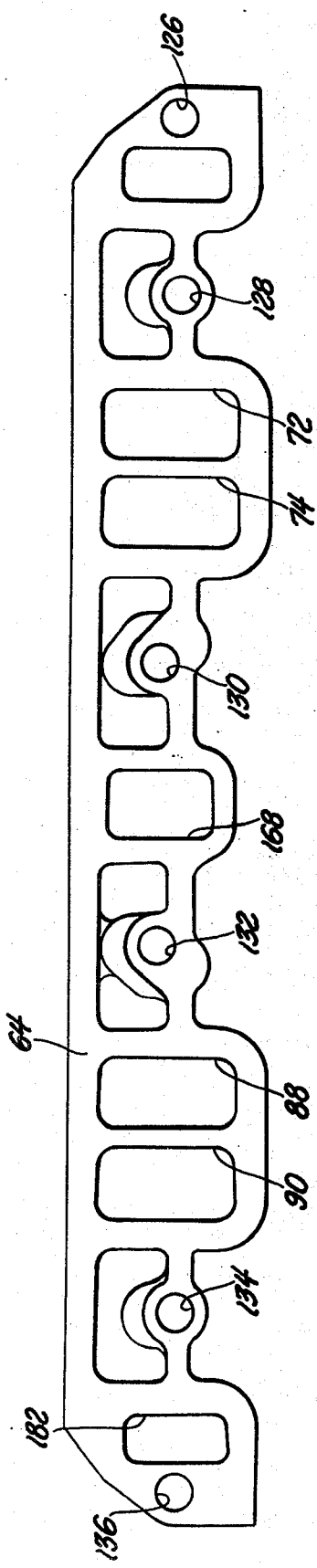
Fig. 6
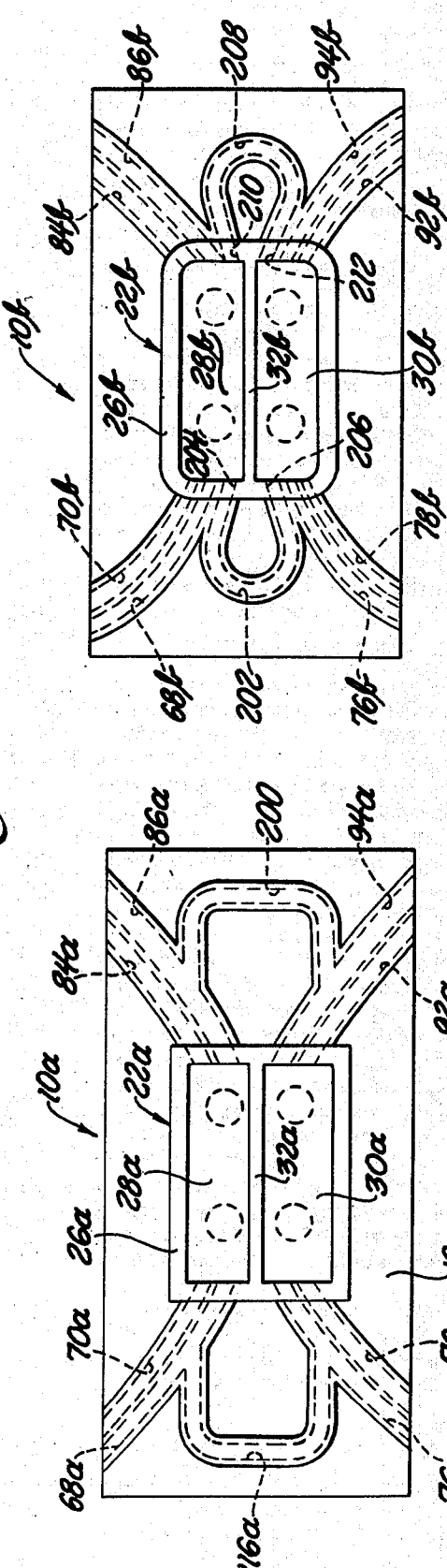
Fig. 7
Fig. 8

INTAKE-MANIFOLD

This is a continuation of application Ser. No. 093,112 filed Nov. 13, 1979 now abandoned.

FIELD OF INVENTION

This invention relates generally to intake manifolds and more particularly to intake manifolds for internal combustion engines and still more specifically to internal combustion engines employing pistons arranged in banks situated at generally opposite sides of the engine crankshaft as in, for example, a "V" like configuration.

BACKGROUND OF THE INVENTION

Heretofore the prior art has proposed many forms of engine intake manifolds some designed specifically for improving the engine fuel economy while others were proposed as ostensibly increasing engine output performance. Seemingly, the prior art, has not been able to perform a "marriage" of such two types of intake manifolds whereby not only is engine output performance increased but engine fuel economy is also improved.

Accordingly, the invention as disclosed and claimed herein is primarily directed to the general improvement of the prior art in that the invention provides an intake manifold which provides for both improved engine fuel economy and engine output performance.

SUMMARY OF THE INVENTION

According to the invention, an engine intake manifold for an internal combustion piston type engine, comprises a body, a riser portion carried by said body, a medially disposed wall portion in said riser, first and second plenum chambers respectively formed on opposite sides of said medial wall in said riser, said body having a forward end and a relatively rearward end, first induction passage means leading from said first plenum chamber extending generally rearwardly therefrom and leading to first outlet aperture means for communication with said engine, second induction passage means leading from said second plenum chamber and extending generally rearwardly as to terminate in a second outlet aperture for communication with said engine, third induction passage means leading from said first plenum chamber and extending generally forwardly thereof and terminating in a third outlet aperture for communication with said engine, fourth induction passage means communicating with said second plenum chamber and extending generally forwardly thereof and terminating in a fourth outlet aperture for communication with said engine, and fifth passage means communicating with only said first and second induction passage means as to form a connection therebetween.

Various general and specific objects, advatages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted:

FIG. 2 is a cross-sectional view taken generally on the plane of line 2—2 of FIG. 1 and looking in the direction of the arrows;

FIG. 3 is a side elevational view taken generally on the plane of line 3—3 of FIG. 1 and looking in the direction of the arrows;

FIG. 6 is a view taken generally on the plane of line 6—6 of FIG. 5 and looking in the direction of the arrows;

FIG. 7 is a top plan view of a generally schematically illustrated induction manifold showing a second embodiment of the invention; and FIG. 8 is a top plan view of a generally schematically illustrated induction manifold showing a third embodiment of the invention.

DETAILED DESCRIPTION OF THE PREFERRED EMBODIMENT

Figure 1:
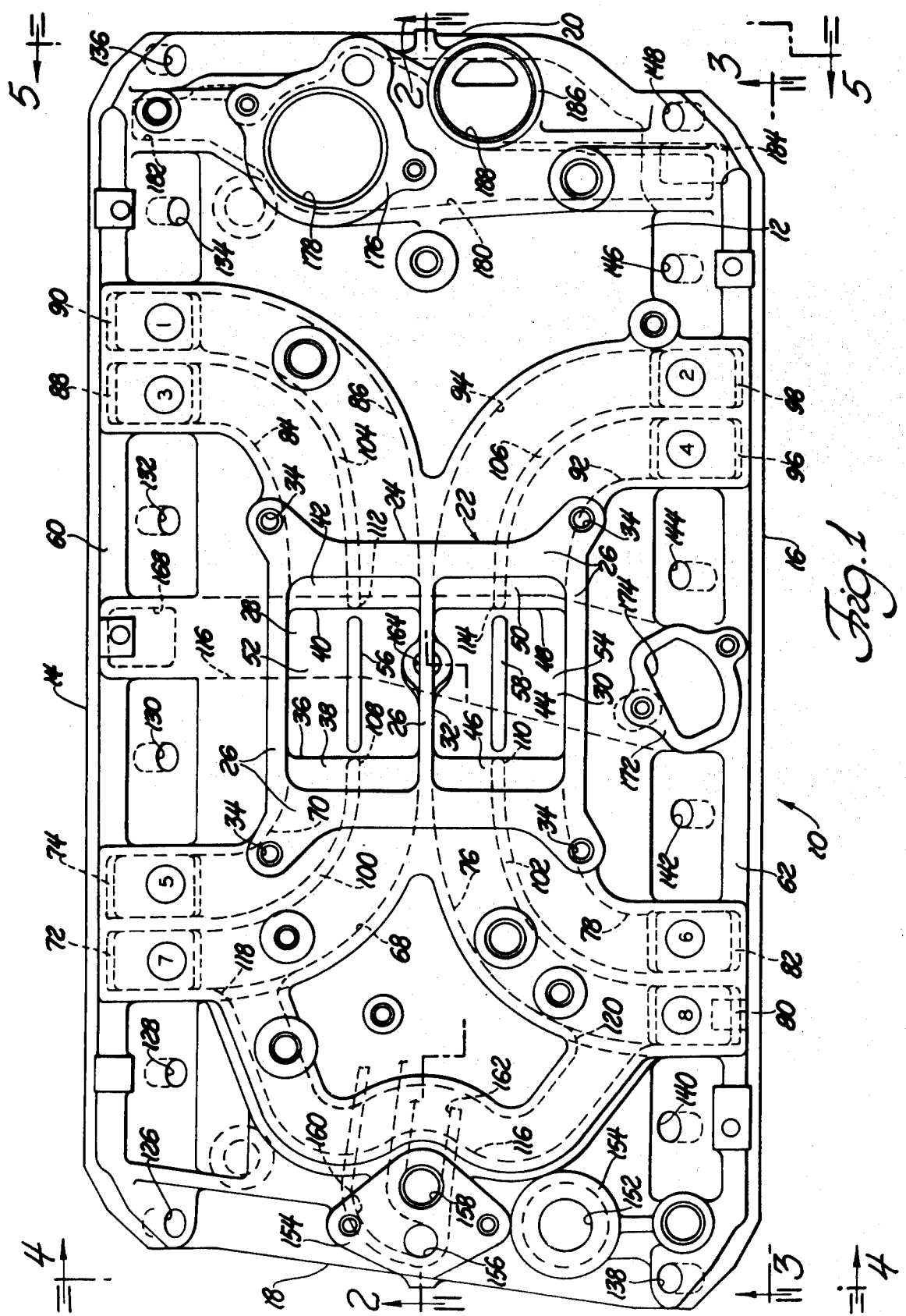
FIG. 1 is a top plan view of an intake manifold employing teachings of the invention.
Figure 4:
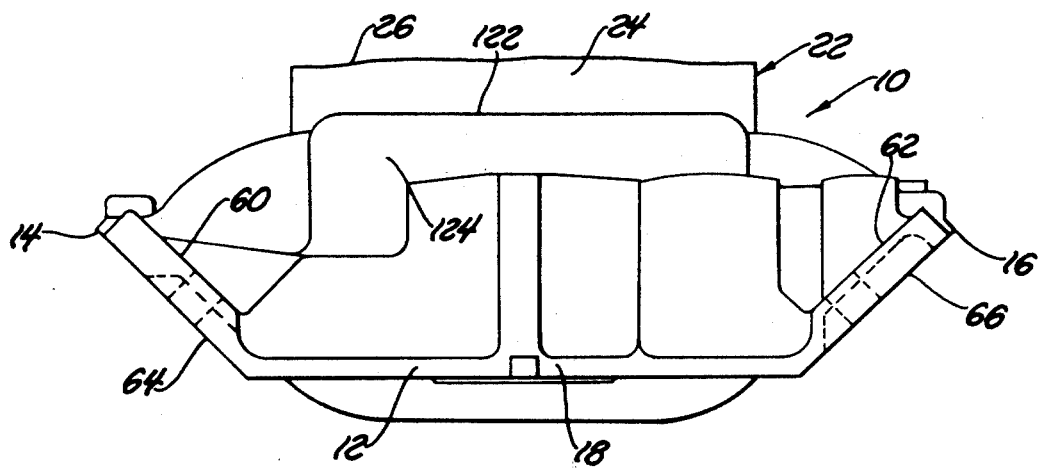
FIG. 4 is an end elevational view, of the rearward end of the intake manifold, taken generally on the plane of line 4—4 of FIG. 1 and looking in the direction of the arrows.
Figure 5:
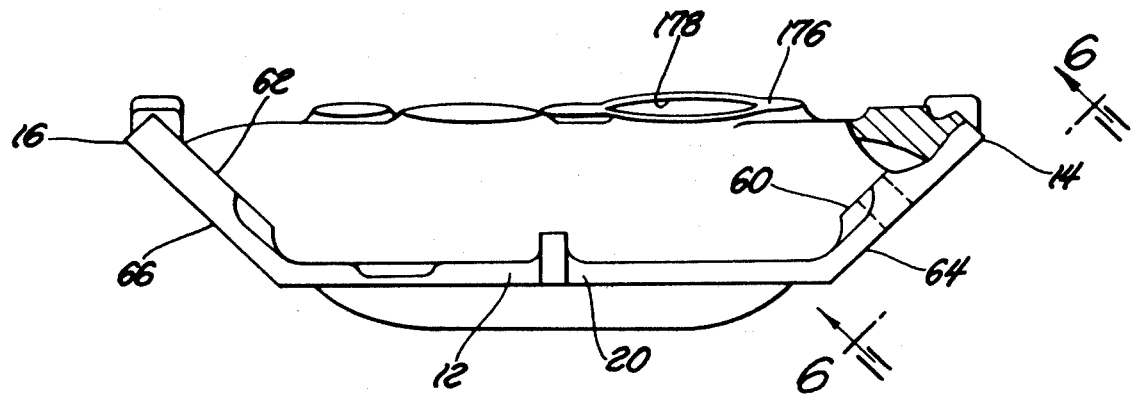
FIG. 5 is an end elevational view, of the forward end of the intake manifold, taken generally on the plane of line 5—5 of FIG. 1 and looking in the direction of the arrows.

Referring now in greater detail to the drawings, FIG. 1 illustrates an intake or induction manifold 10, which in the preferred embodiment is formed as by casting, as comprising a plate or body portion 12 having a generally left side 14, a right side 16, a relatively rearwardly disposed end 18 and a relatively forwardly disposed end 20. The terms "left", "right", "rearward" and "forward" are employed primarily with reference to the usual position that the manifold 10 would assume when assembled onto a cooperating internal combustion engine, as within a vehicle, with the left side being associated with the left bank of engine cylinders and pistons and the right side being associated with the right bank of engine cylinders and pistons.

Referring to each of FIGS. 1, 2 and 3, plenum chamber means, defined as by a riser portion or structure 22 situated generally medially of body 12 and extending upwardly therefrom, serves to receive combustible motive fluid and, through associated induction passage or runner means, direct such motive fluid to the intake valves of the respective cylinders of the associated engine. More particularly, the riser structure 22 is illustrated as comprising a peripherally continuous wall 24 extending generally upwardly and terminating at its upper end in a generally planar surface 26 effective for having operatively secured thereto and thereagainst related fuel metering means such as, for example, a carburetor (not shown but well known in the art). The riser structure 22 is illustrated as further comprising a first plenum chamber 28 and a second plenum chamber 30 which are effectively separated from each other as by a generally medially situated upwardly extending wall 32, effectively forming a continuation of mounting surface 26, and which may be integrally formed with the outer wall 24 of riser 22.

As generally depicted in FIGS. 2 and 3, the mounting surface 26, which may be provided with a plurality of threaded holes 34 for receiving screws to secure the carburetor thereto, is somewhat inclined with respect to the lower surface of the base or plate portion 12 as to accommodate for those situations where the rearward portion of the engine associated with the intake manifold 10 is situated lower than the forward portion of the engine. Obviously, in those situations where there is no difference in height as between the forward and rearward portions of the engine, the mounting surface 26 could be generally parallel with the bottom surface of the base or plate portion 12 and in those situations where the forward portion of the engine is lower than the rearward portion, the mounting surface could be inclined in a direction generally reversed to that illustrated. Primarily, the purpose of inclining the mounting surface is to result in a substantially horizontal disposition of the associated fuel metering apparatus when operatively secured to the mounting surface 26 and with the manifold 10 operatively secured to the associated engine.

As shown in each of FIGS. 1, 2 and 3, plenum chamber 28 is preferably provided at its rearward end with a generally downwardly and inwardly extending extension or deflector portion 36 which, in turn, is preferably provided with an upwardly disposed arcuate surface 38. A second generally downwardly and inwardly extending extension or deflector portion 40, with an upwardly disposed arcuate surface 42, is preferably provided at the forward end of plenum chamber 28 as to generally oppositely disposed to deflector portion 36.

Similarly, plenum chamber 30 is preferably provided at its rearward end with a generally downwardly and inwardly extending extension or deflector portion 44, which is provided with an upwardly disposed arcuate surface 46, and, at its forward end with a generally downwardly and inwardly extending extension or deflector portion 48 which is similarly provided with an upwardly disposed arcuate surface 50.

As shown in FIGS. 1, 2 and 3, the floors or bottom surfaces 52 and 54 of plenum chambers 28 and 30 are preferably provided with relatively low rise rib or wall portions 56 and 58, respectively, with such being situated as to be, as viewed in FIG. 1, generally medially disposed within the plenum chambers 28 and 30.

Referring to FIGS. 1, 3, 4, 5 and 6, it can be seen that in the preferred embodiment the manifold base or plate portion 12 has longitudinally extending flange-like portions 60 and 62 situated at opposite sides thereof and, preferably, inclined as to provide respective mounting surfaces 64 and 66 for mounting the intake manifold as to the opposed engine headers respectively associated with the left and right bank of engine cylinders and pistons.

As illustrated in FIG. 1, a first plurality of induction passages or runners 68 and 70 are formed as to have their respective one ends in communication with plenum chamber 28 and to extend generally rearwardly and laterally away from the plenum chamber 28 as to have their respective opposite ends terminating in apertures or outlet ports 72 and 74 in flange surface 64. A second plurality of induction passages or runners 76 and 78 are formed as to have their respective one ends in communication with plenum chamber 30 and to extend generally rearwardly and laterally away from the plenum chamber 30 as to have their respective opposite ends terminating in apertures or outlet ports 80 and 82 in flange surface 66.

A third plurality of induction passages or runners 84 and 86 are formed as to have their respective one ends in communication with plenum chamber 28 and to extend generally forwardly and laterally away from the plenum chamber 28 as to have their respective opposite ends terminating in apertures or outlet ports 88 and 90 in surface 64 of flange 60. A fourth plurality of induction passages or runners 92 and 94 are formed as to have their respective one ends in communication with plenum chamber 30 and to extend generally forwardly and laterally away from the plenum chamber 30 as to have their respective opposite ends terminating in apertures or outlet ports 96 and 98 in surface 66 of flange 62.

As best seen in FIG. 1, induction passages 68 and 70 may be effectively separated from each other as by a common inner wall 100; passages 76 and 78 may be separated from each other as by a common inner wall 102; passages 84 and 86 may be separated from each other as by a common inner wall 104 and passages 92 and 94 may be separated from each other as by a common inner wall 106. In the preferred embodiment, inner walls 100, 102, 104 and 106 have their respective inner ends terminating as in edges or end surfaces 108, 110, 112 and 114 in general elevational alignment with the inner-most surfaces of projecting portions 36, 44, 40 and 48, respectively.

As best seen in FIGS. 1 and 2, additional passage means 116 is provided as to have its opposite ends 118 and 120 in communication respectively with induction passage means 68 and 76 as to form a connection therebetween. In the preferred embodiment, end 118 is in communication with induction passage means 68 as at an area thereof generally between plenum chamber 28 and outlet port 72 while end 120 of passage 116 is in communication with induction passage means 76 as at an area thereof generally between plenum chamber 30 and outlet port 80. The outer top and side surface of the wall means defining connecting passage means 116 is generally depicted as at 122 and 124 of FIG. 4.

Flange 60 may be provided with a plurality of clearance type apertures 126, 128, 130, 132, 134 and 136 while flange 62 may be similarly provided with clearance apertures 138, 140, 142, 144, 146 and 148 for respectively accommodating therein suitable screws or bolts for securably affixing the manifold 10 to cooperating opposed engine headers serving the respective opposed banks of engine cylinders and pistons.

Further, manifold 10 may be provided with various mounting surfaces, passages and clearance apertures as for accommodating various engine accessories and/or related systems. For example, the body or base 12 may be provided with an upstanding pad-like portion 150 having an aperture 152 formed therethrough for accommodating an associated ignition distributor assembly. A second pad-like raised mounting surface 154 may be provided as for the placement thereon of suitable exhaust gas recirculation valving means (often referred to as EGR valve) for controlling the communication as between orifices 156 and 158 of conduit portions 160 and 162 with, as depicted in FIG. 1, conduit portion 160 leading as to passage means 164 communicating with both plenum chambers 28 and 30.

Still referring primarily to FIG. 1, a suitable passage 166 situated generally at the underside of plate or body means 12, and extending generally transversely thereof, serves as an engine exhaust cross-over and has an inlet aperture or port 168 formed in surface 64 of flange 60 and a discharge or outlet aperture or port 170 formed in surface 66 of flange 62. A raised mounting surface 172 provided with a downwardly extending chamber-like recess 174 would serve as a mounting surface for an associated housing and related thermostatic means employed in the control of the choke valve of the carburetor to be associated with the intake manifold 10.

Further, a raised surface 176 may be employed for mounting thereon related thermostatic valve means and related conduit means, leading as to associated engine coolant heat radiator means. An aperture or passage 178 formed through surface 176 communicates with a generally transversely extending passage or conduit 180 which, at opposite ends, terminates in apertures or ports 182 and 184 respectively formed in surfaces 64 and 66 of flanges 60 and 62 as to communicate with juxtaposed ports of the engine cooling system. An additional raised surface 186 is provided with a clearance passage 188 therethrough as to accomodate the reception therein of a related engine oil filler tube or the like.

OPERATION OF THE INVENTION

As is well known, the fuel-air mixture supplied to plenum chamber means of an induction manifold flows through the various interconnected induction passages or runners to the associated engine intake valves as to supply such fuel-air mixture to the respective engine cylinders. Further, it is well known that in an engine having a plurality of cylinders and cooperating pistons, which are collectively connected to associated engine crankshaft means, the power strokes of the pistons are staggered with respect to each other as to be spaced in terms of degrees of rotation of the crankshaft means.

Specifically, with reference to FIG. 1, let it be assumed that the associated engine has, in its left bank, arbitrarily designated piston cylinders 1, 3, 5 and 7 and that induction passages or runners 86, 84, 70 and 68 respectively communicate (through associated engine intake valves) with such piston cylinders. Let it be further assumed that the associated engine has, in its right bank, arbitrarily designated piston cylinders 2, 4, 6 and 8 and that induction passages or runners 94, 92, 78 and 76 respectively communicate (through associated engine intake valves) with such piston cylinders. (For ease of reference, such piston cylinder numbers are indicated within circles generally in the area of the outlet ports of such induction passages.) Further, let it be assumed that each of the cylinder pistons experiences one power stroke (ignition of the fuel-air mixture within the corresponding cylinder) for every two revolutions of the engine crankshaft means and that the sequential firing (ignition) order of the respective piston cylinders is cylinders: 1-8-4-3-6-5-7-2. Since there will be only one power stroke for each piston for every two revolutions of the crankshaft means, therefore there will be only one cylinder intake stroke, for each cylinder, for every two revolutions of the crankshaft means. Therefore, it can be seen that such fuel-air mixture as is supplied to and filling the plenum chambers 28 and 30 and runners 68, 70, 76, 78, 84, 86, 92 and 94 would, during the intake portions of the respective intake strokes, first flow through runner 86 into cylinder 1, then flow through runner 76 into cylinder 8, then through runner 92 into cylinder 4, then through runner 84 into cylinder 3, then through runner 78 into cylinder 6, then through runner 70 into cylinder 5, next through runner 68 into cylinder 7 and finally through runner 94 into cylinder 2 during the completion of two revolutions of the engine crankshaft means.

Accordingly, it can be seen that in such assumed conditions, at least two cylinders in the left bank and two cylinders in the right bank of the engine will experience their intake stroke and "intake" the fuel-air mixture from their respective feeding manifold runners at approximately ninety degrees (90°) of crankshaft rotation from each other. In the assumed conditions, cylinders 5 and 7 of the left bank would "intake" 90° apart from each other and cylinders 4 and 8 of the right bank would "intake" 90° apart from each other.

In the invention, the plenum chambers 28 and 30 are effectively separated from each other by wall means 32 thereby causing each plenum chamber, 28 and 30, to receive half of the output of the associated carburetor feeding the engine. By providing the interconnecting passage means 116, as between runners 68 and 76, pulsating flow is experienced therethrough. A strong pulsating flow is created in the passage or connection means 116 as a consequence of and when cylinders 5 and 7 "intake" 90° apart from each other and when cylinders 4 and 8 "intake" 90° apart from each other. As should be apparent, the frequency of such a pulse within the connection means 116 is once per 360° of revolution of the engine crankshaft means. The connection means 116 thusly serves as a resonating channel and in one successful embodiment of the invention, the effective length thereof was approximately 10.0 inches.

During testing of intake manifolds constructed in accordance with the invention and in comparing the performance thereof as against manifolds of the prior art, it was found that engines equipped with manifolds of the invention provided an improvement in the combined fuel economy of approximately 8.8% (the "combined" fuel economy being weighted on 55.0% city driving and 45.0% highway driving) and a significant increase in the engine output torque at the relatively lower half of the overall engine output thereby providing for greater acceleration. For example, in ¼ mile times, vehicles equipped with manifolds of the invention produced 6.0 m.p.h. increase over the prior art manifolds. Further, it was discovered that significant reductions in engine exhaust hydrocarbons and oxides of nitrogen were also achieved.

In FIGS. 7 and 8 which illustrate, somewhat simplistically, two other embodiments of the invention, all elements like or similar to those of FIGS. 1-6 are identified with like reference numbers with those of FIG. 7 being provided with a suffix "a" and those of FIG. 8 being provided with a suffix "b".

Referring to FIG. 7, it can be seen that second connection conduit or passage means 200 is provided as between runners 86a and 94a in order to be responsive to the pulses created thereby and consequently provide for pulsed flow through the connection means 200.

In the embodiment of FIG. 8, instead of having connection means as 116 or 116a communicating with the plenum chambers as via runner means 68 and 76 or 68a and 76a, connection means 202 is provided which has its opposite ends 204 and 206 in direct commnication with plenum chambers 28b and 30b, respectively. If desired, and as generally suggested by the embodiment of FIG. 7, a second connection means 208 may also be provided as to have its opposite ends 210 and 212 also in direct communication with plenum chambers 28b and 30b, respectively.

Although only a preferred embodiment and two modifications of the invention have been disclosed and described, it is apparent that other combinations, embodiments and modifications of the invention are possible within the scope of the appended claims.

What is claimed is:

1. An intake manifold for an internal combustion engine, comprising riser structure means, first and second plenum chamber means at least partly defined within the interior of said riser structure means, first induction passage means, said first induction passage means communicating at one end thereof with said first plenum chamber means and extending therefrom as to terminate in first outlet port means for operative connection to said engine, second induction passage means, said second induction passage means communicating at one end thereof with said second plenum chamber means and extending therefrom as to terminate in second outlet port means for operative connection to said engine, first passage connection means situated generally internally of said riser structure means and effective for operatively interconnecting said first and second plenum chamber means with a source of exhaust gases of said engine for induction and recirculation of at least a portion thereof, and second passage connection means, said second passage connection means being situated externally of said riser structure means and having its opposite ends in communication with said first and second plenum chamber means respectively and separately from said first passage connection means, wherein said first induction passage means comprises at least first and second induction passages, wherein said first outlet port means comprises at least first and second outlet ports, wherein said first and second induction passages respectively terminate in said first and second outlet ports, wherein said second induction passage means comprises at least third and fourth induction passages, wherein said second outlet port means comprises at least third and fourth outlet ports, and wherein said second passage connection means communicates with said first and second plenum chamber means by having said opposite ends thereof respectively communicating directly and only with said first and third induction passages.

2. An intake manifold according to claim 1 and further comprising third induction passage means, said third induction passage means communicating at one end thereof with said second plenum chamber means and extending therefrom as to terminate in third outlet port means for operative connection to said engine.

3. An intake manifold according to claim 1 and further comprising third induction passage means, said third induction passage means communicating at one end thereof with said first plenum chamber means and extending therefrom as to terminate in third outlet port means for operative connection to said engine, and fourth induction passage means, said fourth induction passage means communicating at one end thereof with said second plenum chamber means and extending therefrom as to terminate in fourth outlet port means for operative connection to said engine, wherein said third induction passage means comprises at least fifth and sixth induction passages, wherein said third outlet port means comprises at least fifth and sixth outlet ports, wherein said fifth and sixth induction passages respectively terminate in said fifth and sixth outlet ports, wherein said fourth induction passage means comprises at least seventh and eighth induction passages, wherein said fourth outlet port means comprises at least seventh and eighth outlet ports, and wherein said seventh and eighth induction passages respectively terminate in said seventh and eighth outlet ports.

4. An intake manifold according to claim 1 and further comprising third induction passage means, said third induction passage means communicating at one end thereof with said first plenum chamber means and extending therefrom as to terminate in third outlet port means for operative connection to said engine.

5. An intake manifold according to claim 4 and further comprising fourth induction passage means, said fourth induction passage means communicating at one end thereof with said second plenum chamber means and extending therefrom as to terminate in fourth outlet port means for operative connection to said engine.

6. An intake manifold according to claim 5 wherein said first and second plenum chambers respectively comprise first and second end wall surfaces, and first and second rib-like wall portions respectively carried by said first and second end wall surfaces, wherein said first rib-like wall portion extends longitudinally generally between said one end of said first induction passage means and said one end of said third induction passage means, and wherein said second rib-like wall portion extends longitudinally generally between said one end of said second induction passage means and said one end of said fourth induction passage means.

7. An intake manifold for an internal combustion engine, comprising riser structure means, first and second plenum chamber means at least partly defined within the interior of said riser structure means, first induction passage means comprising at least first and second induction passages, said first induction passage means communicating at one end thereof with said first plenum chamber means and extending therefrom as to terminate in first outlet port means comprising at least first and second outlet ports for operative connection to said engine, second induction passage means comprising at least third and fourth induction passages, said second induction passage means communicating at one end thereof with said second plenum chamber means and extending therefrom as to terminate in second outlet port means comprising at least third and fourth outlet ports for operative connection to said engine, first passage connection means situated generally internally of said riser structure means and effective for operatively interconnecting said first and second plenum chamber means with a source of exhaust gases of said engine for induction and recirculation of at least a portion thereof, and second passage connection means, said second passage connection means being situated externally of said riser structure means and having its opposite ends in communication with said first and second plenum chamber means respectively via an interconnection only with said first and third induction passages, said second passage connection means being separate from said first passage connection means.

* * * * *